Oct. 13, 1970   R. L. RISBERG   3,534,239
ELECTRONIC TRACTOR DRIVE SYSTEM
Filed May 31, 1968   6 Sheets-Sheet 1

Inventor
Robert L. Risberg
By Wm. A. Autio
Attorney

Oct. 13, 1970 — R. L. RISBERG — 3,534,239
ELECTRONIC TRACTOR DRIVE SYSTEM
Filed May 31, 1968 — 6 Sheets-Sheet 2

Inventor
Robert L. Risberg
By Wm. A. Autio
Attorney

United States Patent Office 3,534,239
Patented Oct. 13, 1970

3,534,239
ELECTRONIC TRACTOR DRIVE SYSTEM
Robert L. Risberg, Milwaukee, Wis., assignor to Cutler-Hammer, Inc., Milwaukee, Wis., a corporation of Delaware
Filed May 31, 1968, Ser. No. 733,507
Int. Cl. B61c *15/08*
U.S. Cl. 318—52                    10 Claims

ABSTRACT OF THE DISCLOSURE

An electronic tractor drive system for land transportation wherein steering is performed by other means than individual drive wheel speed control. Speed reference is set by a foot pedal and is compared in a common comparator to the mean value of the individual wheel speeds. The resultant error signal is fed to both left and right wheel motor controllers. In each controller, a limiter prevents excessive current reference whereby it acts as a current limit. The limiter is controlled by motor voltage to allow 250 percent of full load current at low speed where it is needed but only 150 percent of full load current at full speed which is adequate. Each motor speed signal is reduced to one-half of the feedback required by the comparator for steady state operation and fed back to the input comparator whereby if a wheel loses traction its motor accelerates to 100 percent counter voltage but produces only one-half the total required feedback so that by pressing the foot pedal beyond the one-half point, the freely turning wheel cannot satisfy the comparator for steady state operation and torque will be supplied to the standstill wheel to provide tractive effort. The power control system uses compound motors to drive the wheels and bilateral choppers to control the motors and provides regeneration of energy from the vehicle back into the battery at any speed on overhauling loads such as deceleration or stopping or downhill operation and does so without instability.

BACKGROUND OF THE INVENTION

This invention relates to an electronic tractor drive control system in the art of land transportation wherein steering of the tractor is accomplished by means other than varying the wheel speeds, such as by conventional front wheels steering, or in a tractor having only two drive wheels, by two hydraulic rams for kinking the tractor and wagon. Former systems using series motors connected across the battery resulted in the outer wheel on a turn producing no torque and the inner wheel providing all of the tractive effort. In other prior system having a single motor drive shaft and a differential gearing to the wheels, the desired load sharing is accomplished on turning, but if one wheel loses traction, the other wheel loses torque. The invention overcomes these disadvantages of the prior art.

SUMMARY OF THE INVENTION

This invention relates to an electronic drive system having an individual electric motor for each of the two wheels of a tractor wherein steering is accomplished by means other than control of individual wheel speeds.

An object of the invention is to provide an improved electronic system for controlling the motors of the driving wheels of a land vehicle.

A more specific object of the invention is to provide an improved electronic tractor drive system with means operable when one drive wheel loses traction and spins for supplying torque to the other drive wheel.

Another specific object of the invention is to provide an improved power control system using a compound motor that will provide regeneration of energy from the vehicle back into the battery at any speed on overhauling loads such as deceleration, stopping, or downhill operation and to do so without instability.

Another specific object of the invention is to provide an improved electronic control system for an electrically powered vehicle with means limiting the control signal thereby to provide current limiting action.

Another specific object of the invention is to provide an improved electronic control system for an electrically powered vehicle with means limiting the control signal as a function of wheel drive motor countervoltage thereby to reduce the maximum motor current obtainable at full speed as compared to the amount obtainable at low speed.

Another specific object of the invention is to provide an improved electronic wheel drive system for a tractor with means for limiting the maximum negative torque to a smaller value than the maximum positive torque that is obtainable to provide for smoother deceleration.

Another specific object of the invention is to provide in an electronic chopper type motor control system for powering the wheels of a tractor means operable when one wheel spins for providing torque to the other wheel.

Another specific object of the invention is to provide an improved electronic drive control system having the aforementioned features in combination.

Other objects and advantages of the invention will hereinafter appear.

DESCRIPTION OF THE PREFERRED EMBODIMENT

Figure 1:
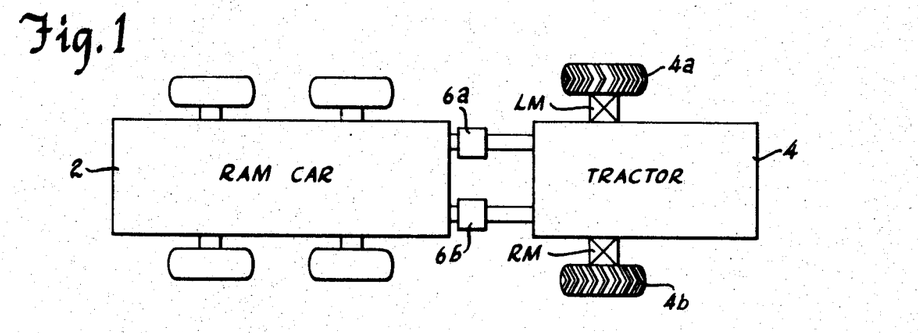
FIG. 1 is a schematic top view of a mine vehicle in which the invention may be used to drive the tractor wheels.

Referring to FIG. 1, there is shown a tractor-drawn ram car for mining service in which the invention may be used to drive the two wheels of the tractor. Ram car 2 which is like a four-wheeled wagon gets its name from the hydraulic ram, not shown, which is used to push the load of material such as earth off the wagon. Tractor 4 is provided with two driving wheels 4a and 4b which are driven by electric motors in accordance with the invention hereinafter described, these motors being shown as the left motor LM and the right motor RM in the schematic and the circuit diagram. Steering of the vehicle is performed by two hydraulic rams 6a and 6b connected between the tractor and the ram car. For a left turn, ram 6a is contracted and ram 6b is extended at the same time, thus causing the tractor and ram car to "kink" or partly double or fold toward the left and thereby to turn in the left-hand direction. For a right turn, ram 6a is extended and ram 6b is contracted. This type of steering is exemplary and other means may be used since the invention herein involves the system for controlling the driving wheels of the tractor.

Figure 2:
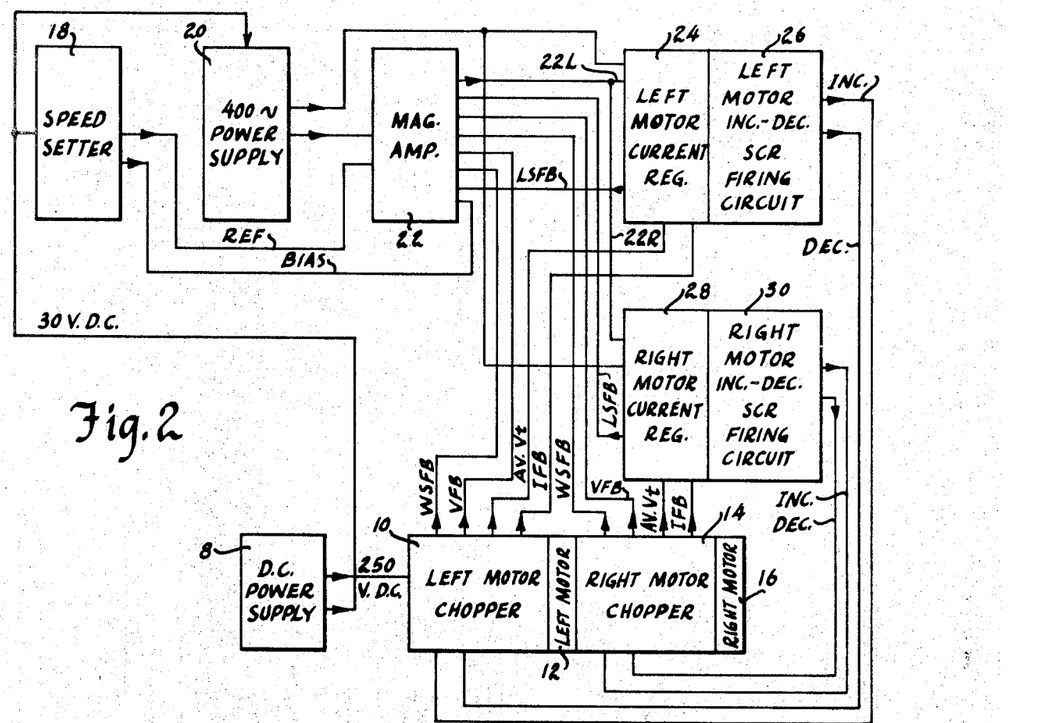
FIG. 2 is a block diagram of the electronic tractor drive control system arranged in accordance with the invention.

The block diagram in FIG. 2 shows such system for controlling the two driving wheels of the tractor. A D.C.

power supply 8 supplies direct current power of 250 volts or the like through a left motor chopper circuit 10 to left motor LM and also through right motor chopper circuit 14 to right motor RM.

Figure 6:
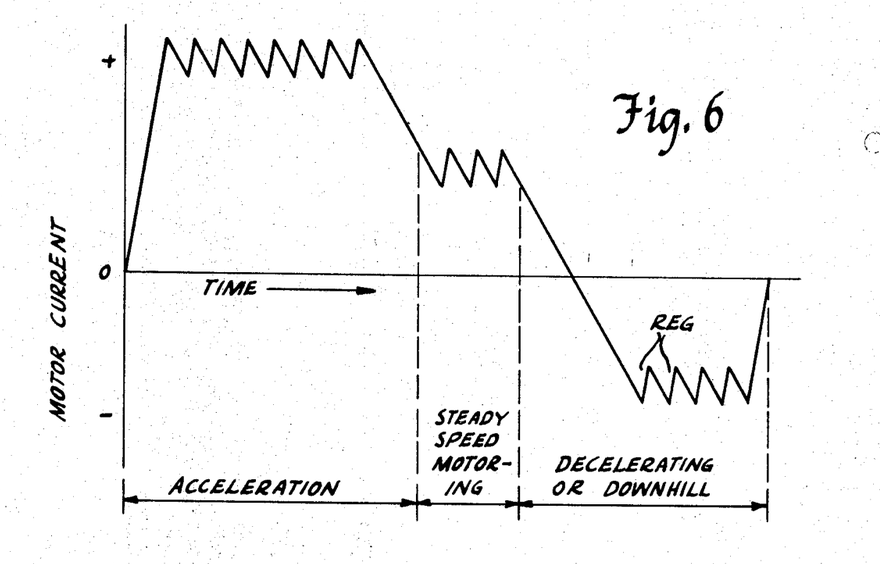
FIG. 6 is a graphical illustration of motor current under chopper operation.

As disclosed in my copending application Ser. No. 877,923, filed Nov. 19, 1969, which is a continuation of my application Ser. No. 637,530, filed May 10, 1967, now abandoned, each chopper operates as follows to control the current to its associated motor. The current reference signal $I_{ref}$, as hereinafter more fully described, will vary from plus 2 volts to plus 9 volts. Added to this signal $I_{ref}$ is a current feedback signal IBF which is proportional to motor current and, as will be understood, may be positive or negative. The algebraic sum of these two signals is fed to the level detector firing circuit. The characteristic of the latter is that an input signal greater than 5 volts will cause the increase SCR of the chopper to be fired turning off the decrease SCR, and an input signal less than 4 volts will cause the decrease SCR to be fired turning off the increase SCR. Except at maximum speed when the increase SCR is "on" continuously, normal operation will cause increase and decrease SCR's to be fired alternately at a frequency on the order of 200 cycles per second. Whenever the increase SCR is "on," the current will have a positive slope and whenever the decrease SCR is "on," the current will have a negative slope. The result will be a D.C. component of current as shown in FIG. 6 with a small sawtooth characteristic superimposed thereon. This D.C. component is used to control the motor.

It can now be seen that an $I_{ref}$ signal of 4.5 volts will result in zero average current. A plus 9 volt $I_{ref}$ will force an average IFB signal of 4.5 volts. And an $I_{ref}$ signal less than plus 4.5 volts (for example 2 volts) will cause a minus 2.5 volt IFB signal to be developed by the armature series resistor. Hence, the D.C. component of armature current is controlled in a closed loop fashion to satisfy $I_{ref}$.

As will be apparent, the left motor drives left wheel 4a of the tractor in FIG. 1 and the right motor drives right wheel 4b thereof.

Power supply 8 also supplies direct current power of 30 volts or the like to a speed setter circuit 18 and to a 400 cycles per second alternating current power supply 20. This power supply 20 supplies square-wave A.C. for operation of a magnetic amplifier comparator 22 and also provides low voltage which is rectified to afford supply voltage such as 20 volts D.C. or the like for left motor current regulator 24, left motor INC.-DEC. SCR firing circuit 26, right motor current regulator 28 and right motor INC.-DEC. SCR firing circuit 30.

Single lines in FIG. 2 indicate the various control functions between the component circuits represented by the blocks. These functions will become clear from the detailed description of the circuit diagram hereinafter appearing. Generally, these functions include the following. Reference voltage is applied from the speed setter circuit through line REF to the magnetic amplifier comparator to control the speed of the motors. Bias voltage is applied from the speed setter circuit through line BIAS to the magnetic amplifier comparator to set the latter to an initial operating condition from which it is operated by the adjustable reference voltage. An error voltage signal is applied from the magnetic amplifier comparator through lines 22L and 22R to the left motor current regulator and the right motor current regulator, respectively. Local stabilizing feedback signals are applied from the left and right motor current regulators through two lines LSFB, respectively, to the magnetic amplifier comparator. Wave shaping (A.C. canceling) feedback signals are applied from the left and right chopper and motor circuits through two lines WSFB, respectively, to the magnetic amplifier comparator. Voltage feedback signals are applied from the left and right chopper and motor circuits through lines VFB, respectively, to the magnetic amplifier comparator. Average armature terminal voltage feedback signals are applied from the left and right chopper and motor circuits through two lines $AV.V_t$ to the left and right current reference limiter circuits in the corresponding regulators, respectively. Motor current feedback signals are applied from the left and right chopper and motor circuits through lines IFB to the left and right current regulator circuits, respectively. Increase and decrease firing signals are applied from the left motor INC.-DEC. SCR firing circuit through two lines INC. and DEC., respectively, to the left motor chopper. Increase and decrease firing signals are applied from the right motor INC.-DEC. SCR firing circuit through two lines INC. and DEC., respectively, to the right motor chopper. A more detailed description of these signals and their effect will hereinafter appear.

Figure 3:
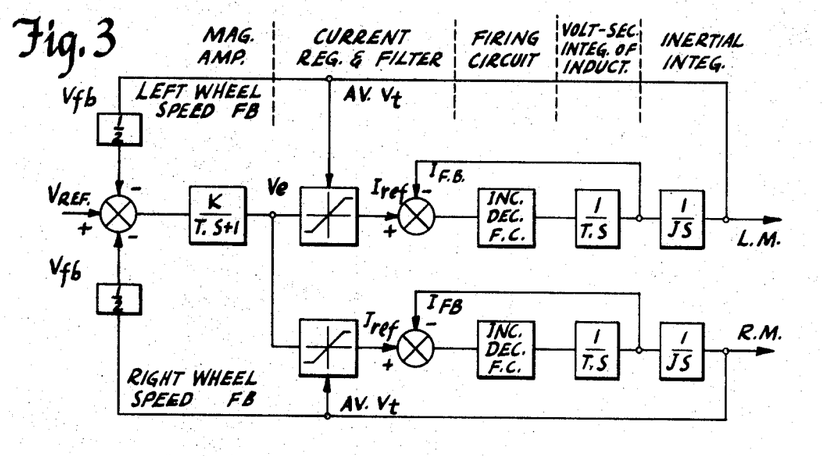
FIG. 3 is a more detailed block diagram of the primary parts of the electronic tractor drive control system of the invention.

Referring to FIG. 3, there is shown in a block diagram in more detail than in FIG. 2 the primary functional parts of the control system providing a general understanding thereof. As shown therein, speed reference (reference voltage $V_{ref}$ is set by a potentiometer actuated by a foot pedal. This speed reference is compared with the mean value of the individual wheel speeds $V_{fb}$. Under conditions of no slippage, mean wheel speed is vehicle speed. The resultant (difference) of these signals, the speed reference minus the two wheel speeds, provides an error signal $V_e$ that is amplified in the magnetic amplifier and applied to both motor controllers. In each controller, the voltage error signal becomes a current reference signal and is first fed through a current regulator and limiter. This limiter prevents excessive positive current reference signal and limits current reference signal indicative of negative torque and acts in effect as a current limiting device. In each motor controller, the current reference signal is then compared with a current feedback signal for torque regulation and applied to a firing circuit which controls the increase and decrease SCR's of the associated chopper circuit. As shown in FIG. 3, in each motor controller, a minor loop current regulation maintains motor current at the reference level.

Following the inertial torque integration of the motor and load masses, represented by 1/JS in FIG. 3, a speed signal (counter voltage) is reduced preferably to one-half the total required feedback and fed back from each motor chopper circuit to the comparator (magnetic amplifier). These two signals $V_{fb}$ represent the mean value of the individual wheel speeds and are compared with the foot-pedal-adjusted speed reference signal as aforementioned.

The power circuit is a chopper hereinafter described. In this chopper, the duty cycle of the increase SCR approaches unity as the counter voltage of the motor is brought up to full battery (supply) potential. The decrease SCR carries motor current only during overhauling conditions. The positive value limit of the limiter is reduced, by average terminal voltage feedback $AV.V_t$ from the motor armature, as the counter voltage increases to offset the effect of the increased duty cycle. For example, at low speeds, the controller can demand 250 percent of rated current but at full speed it can demand only 150 percent of rated current. The SCR's will actually be cooler at 250 percent current at low speed than at the smaller value of current at full speed because the load current is free-wheeling most of the time up through the diode in parallel with the decrease SCR. This characteristic matches the requirement for the traction since high torque is required at low speed for pushing, accelerating, etc., whereas 150 percent torque is adequate at high speed. These percentages can be adjusted by changing component values in the system.

This system exhibits desirable characteristics when turning, going up or down hill, during acceleration, deceleration and when traction is lost on one wheel. For example, when the vehicle is turning, the inside wheel must rotate at a slower speed than the outside wheel but it is nevertheless desirable that both wheels provide tractive effort.

With the system of the invention, and using an 100−X percent shunt, X percent series motor, load sharing is accomplished. If a wheel loses traction, it accelerates to 100+X percent speed and 100 percent counter voltage. This is reduced to ½ the total speed feedback before being fed back to the input comparator as shown in FIG. 3. Consequently, by depressing the speed reference potentiometer pedal past the one-half point, a freely turning wheel cannot satisfy the regulator and the other wheel will be driven with whatever torque is necessary.

Figure 4:
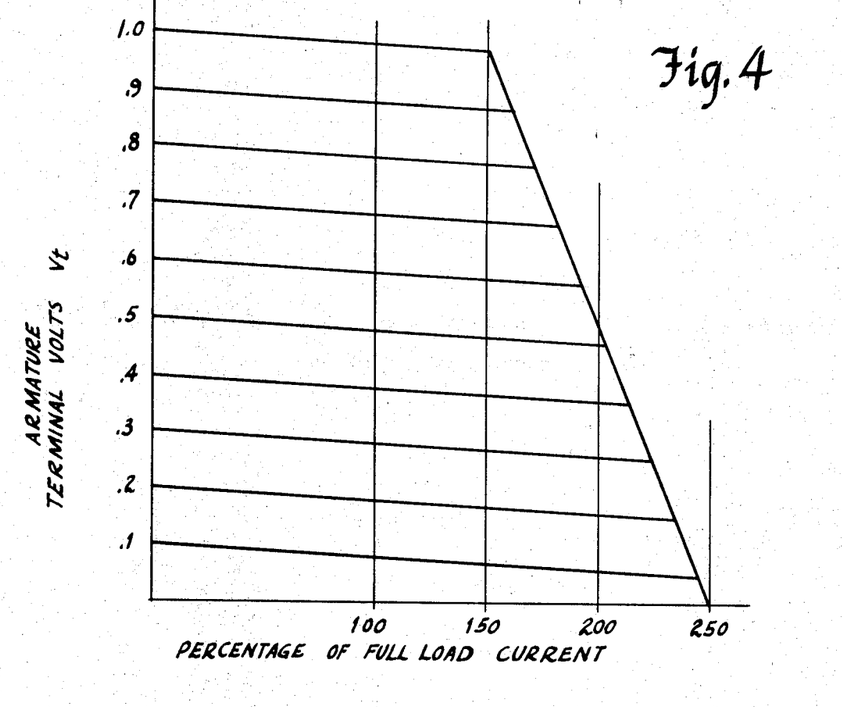
FIG. 4 is a graphical illustration of certain operating characteristics of the invention.

The curves in FIG. 4 illustrate graphically the operating characteristics of the invention. As shown therein, motor armature counter volts are plotted along the axis of ordinates and percentages of full load current are plotted along the axis of abscissas. The sloping line shows current limiting action as a function of counter voltage. As shown thereby, for increasing values of counter voltage there is a proportional linear decrease in the maximum percentage of full load current that is obtainable. The slope of this line may be changed or the line shifted horizontally by modifying component values in FIG. 5b.

The curve in FIG. 6 illustrates how the motor current varies during acceleration, during steady speed motoring operation and during deceleration or downhill operation when regeneration takes place.

FIGS. 5a to 5d, when arranged in sequence from left to right, show the circuit diagram of the system of the invention including left motor LM and right motor RM that power the wheels of the tractor.

Figure 5A:
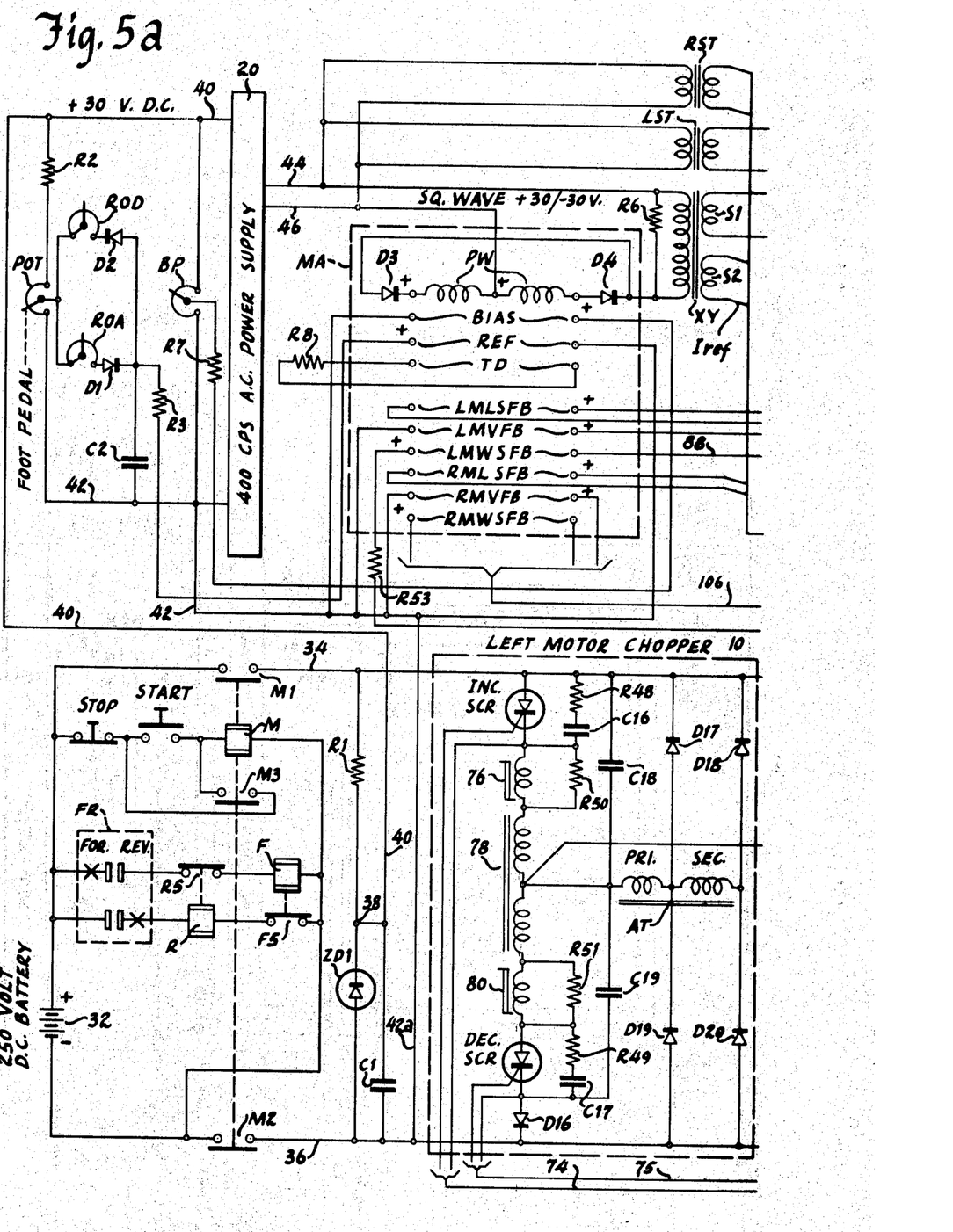
FIGS. 5a to 5d show a circuit diagram of the electronic tractor drive control system constructed in accordance with the invetnion.

Power is supplied to the system at the lower portion of FIG. 5a from a direct current source such as a 250 volt D.C. battery 32 or the like. Since, in the exemplary version, the system is carried on a land vehicle driven and steered by an operator, such a portable source of power is used. The components of the circuit diagram will be described in connection with the following description of operation of the system.

The system is operated by pressing the START switch, turning the forward-reverse switch FR to one of its operating positions and then pressing the foot pedal to start the tractor and control the speed thereof. When the START switch is pressed, it closes a circuit to energize the operating coil of main contactor M through the STOP switch across battery 32. Contactor M closes its contacts M1 and M2 to connect the positive and negative sides of the battery to positive and negative supply lines 34 and 36, respectively, which supply operating voltage through the left motor chopper circuit to left motor LM and through the right motor chopper circuit to right motor RM. Contactor M also closes its contact M3 to complete a self-maintaining circuit in shunt of the START switch whereafter the latter may be released to allow it to reopen.

Figure 5B:
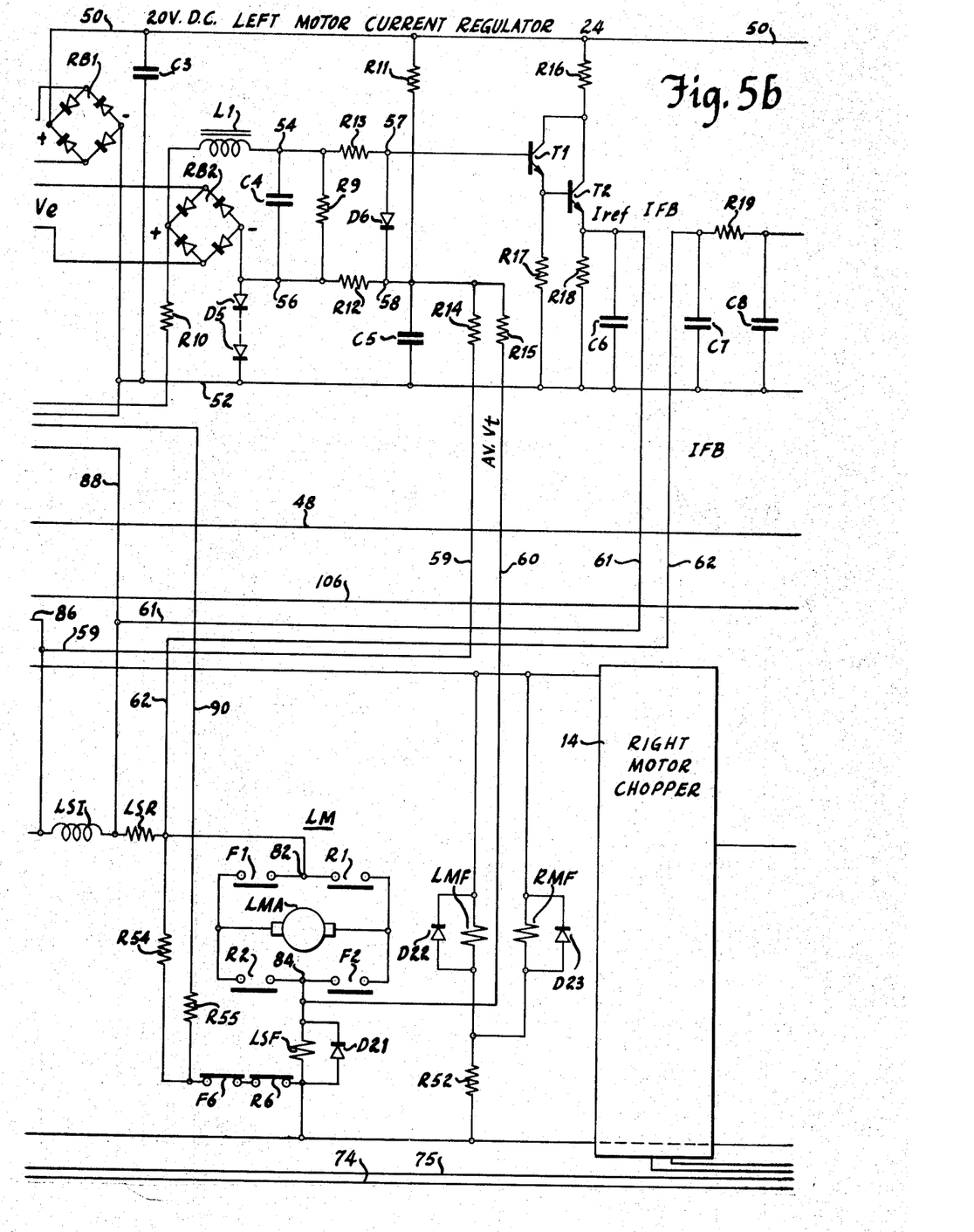

The aforementioned closure of contacts M1 and M2 causes left motor shunt field winding LMF in FIG. 5b to be energized across supply conductors 34 and 36 when the battery is connected thereto. In a similar manner, right motor shunt field winding RMF is energized across supply conductors 34 and 36 when the battery is connected thereto.

The aforementioned application of battery voltage across supply conductors 34 and 36 causes direct current to flow from conductor 34 in FIG. 5a through voltage dropping resistor R1 and Zener diode ZD1 to supply conductor 36. At first this current flows to smoothing capacitor C1 until it charges to the breakover voltage of Zener diode ZD1 whereupon the Zener diode breaks over and passes current to maintain the voltage at junction 38 at 30 volts positive. This reduced and regulated voltage is applied from junction 38 through positive voltage supply conductor 40 to the speed setter circuit in the upper left-hand portion of FIG. 5a. This voltage causes current to flow from positive conductor 40 through "minimum" resistor R2 and the resistor of potentiometer POT to negative or common conductor 42. This common conductor 42 is connected through a branch 42a thereof to negative conductor 36 at the lower portion of FIG. 5a.

As shown in the upper portion of FIG. 5a, potentiometer POT forms a part of the speed setter circuit 18 shown in block diagram in FIG. 1. This circuit includes this speed setter potentiometer POT having its slider mechanically connected as indicated by a broken line to the foot pedal of the tractor whereby the driver controls the running speed. The slider of the speed setter potentiometer is connected through a rate of acceleration adjusting variable resistor or rheostat ROA, a unidirectional diode D1 in its forward low impedance direction, a current limiting resistor R3 and speed reference winding REF of a magnetic amplifier MA to common conductor 42. A rate of deceleration adjusting variable resistor or rheostat ROD and a unidirectional diode D2 are connected in series across rheostat ROA and diode D1 with diode D2 being poled in the opposite direction for deceleration control. A timing capacitor C2 is connected across resistor R3 and winding REF to time acceleration and deceleration as hereinafter described.

Conductors 40 and 42 are connected to alternating current power supply 20 to provide positive 30 volts D.C. operating voltage thereto. Since suitable circuits for power supply 20 are well known in the art, the details thereof have not been shown to avoid complicating the drawings, For example, a power supply if this type may comprise a relaxation oscillator of the unijunction transistor type or the like supplied from lines 40 and 42 to produce a series of pulses. These pulses may be inverted from positive to negative in a transistor and then applied to operate a transistor flip-flop circuit. The two outputs of the flip-flop circuit may be connected through respective high gain current amplifiers such as Darlington pairs (each having two transistors connected in Darlington configuration) to opposite ends of a center-tapped primary winding of an output transformer, the center-tap being supplied from positive conductor 40. The secondary winding of the transformer may be connected to output conductors 44 and 46 of power supply 20 to provide a square-wave output voltage that alternates from positive 30 volts to negative 30 volts and back to positive 30 volts, etc.

As shown in FIG. 5a, magnetic amplifier MA is supplied from output conductors 44 and 46 of power supply 20. For this purpose, current flows on one square wave half-cycle from conductor 44 through the primary winding of the magnetic amplifier output transformer XY in one direction and then through a unidirectional diode D3 and left power winding PW of the magnetic amplifier to conductor 46. On the other square wave half-cycle, current flows from conductor 4 through the right power winding PW, unidirectional diode D4 and the primary winding of output transformer XY in the other direction to conductor 44. A resistor R6 is connected across the primary winding of the output transformer as a ballast load to stabilize the mag amp output waveshape.

It will be apparent that the amount of current flow in the power windings and thus the output of the magnetic amplifier is controlled by the energization of the other windings thereof. The various windings have been arranged so that current flow from left to right therethrough as depicted by the plus sign at the left turns the magnetic amplifier toward on and current flow from right to left therethrough as depicted by the plus sign at the right turns it toward off. Current flows from left to right in the power windings. To initially bias the magnetic amplifier off to a fixed point from which it is turned on as desired, current flows from conductor 40 through the resistor of bias potentiometer BP to conductor 42. Adjustable current flows from the slider of the bias potentiometer through a current limiting resistor R7 and winding BIAS to conductor 42. This current flows through the bias winding from right to left to bias the amplifier off.

As the foot pedal is pressed, the slider of the speed setter potentiometer rotates clockwise to increase the current flow to the speed reference winding of the magnetic amplifier to turn it on the desired amount thereby to accelerate the tractor. The rate of acceleration may be set by adjusting rheostat ROA. It will be apparent that rheostat ROA and capacitor C2 form an RC time constant for acceleration. That is, if rheostat ROA is increased (turned counterclockwise), a smaller current will flow so that it will take longer to charge capacitor C2 to the higher voltage each time the foot pedal is depressed. This rate of charging capacitor C2 controls the rate at which the energization of the reference winding is increased. As a result, the rate of acceleration is decreased. Conversely, turning rheostat ROA clockwise increases the rate of acceleration.

Whereas rheostat ROA controls the rate of charging of capacitor C2 to control the rate of acceleration of the tractor, rheostat ROD controls the rate of discharging of capacitor C2 to control the rate of deceleration of the tractor. That is, each time that the foot pedal is let up to reduce the voltage at the slider of the speed setter potentiometer, capacitor C2 discharges by current flow through diode D2 and rheostat ROD and the lower portion of potentiometer POT. The RC time constant of capacitor C2 and rheostat ROD and thus the rate of deceleration is controlled by adjustment of rheostat ROD.

The magnetic amplifier is provided with a number of control windings in addition to the power windings, bias winding and speed reference winding hereinbefore described. A time delay winding TD has a resistor R8 of relatively high value such as 18 kilohms connected thereacross to provide a time delay in the functioning of the magnetic amplifier to smooth out its operation. In addition, there are three windings controlled by the left motor control circuits and three similar windings controlled by the right motor control circuits. These windings include left motor local stabilizing feedback winding LMLSFB, left motor voltage feedback winding LMVFB and left motor wave shaping feedback winding LMWSMB, and respectively corresponding windings for the right motor prefixed with an R instead of an L as shown in FIG. 5a. The function of these windings will be further described hereinafter. Generally, the magnetic amplifier provides an error voltage output $V_e$ as a result of comparison of the feedback voltages of the motors with the reference voltage.

Referring to the upper portion of FIG. 5a, supply voltage is applied from conductors 44 and 46 through a left supply transformer LST, which steps the voltage down to 20 volts, to the supply voltage input terminals of a left motor current regulator circuit shown at the upper portion of FIG. 5b. In a similar manner, conductors 44 and 46 in FIG. 5a supply voltage through right supply transformer RST of the step down type and cable 48 to the supply voltage input terminals of a right motor current regulator circuit 28.

In the left motor current regulator, the supply voltage is rectified in a full-wave rectifier bridge RB1 to apply 20 volts D.C. across supply conductors 50 and 52, conductor 50 receiving positive voltage and common conductor 52 being at neutral or zero voltage relative thereto. A smoothing capacitor C3 is conected across conductors 50 and 52. Conductors 50 and 52 supply voltage also to left motor SCR firing circuit 26 in FIGS. 5c and 5d.

Error voltage $V_e$ is applied from the magnetic amplifier to both the left motor current regulator and the right motor current regulator. For this purpose, output transformer XY of the magnetic amplifier is provided with two secondary windings, winding S1 applying the error voltage signal to the left motor current regulator and winding S2 applying the error voltage signal through cable 48 to the right motor current regulator.

In the left motor current regulator, this error voltage signal is rectified in full-wave rectifier bridge RB2 and applied from the positive output terminal thereof through a LC filter comprising an inductor L1 and a capacitor C4 in series connection to the negative terminal of this bridge. The output terminals of the LC filter are terminal 54 between inductor L1 and capacitor C4 and terminal 56 between capacitor C4 and diodes D5. A resistor R9 is conected across terminals 54 and 56 to form a minimum load.

The voltage at the positive output terminal of bridge RB2 is applied through a resistor R10 and left motor local stabilizing feedback winding LMLSFB to common conductor 52 to provide a certain amount of negative feedback to stabilize the magnetic amplifier characteristics.

A circuit providing current limit variable with motor speed is conected to terminals 54 and 56. For this purpose, a voltage divider comprising resistors R11 and R12 and diodes D5 in series is connected from supply conductor 50 to common conductor 52. The junction between resistor R12 and diodes D5 is connected to negative terminal 56 of rectifier bridge RB2. A desired number of these pedestal forming diodes D5 may be used to add a pedestal voltage of substantially 2 volts, for example, to the error voltage $V_e$ to reduce the negative torque obtainable for smoother stopping as hereinafter more fully described. Terminal 54 is connected through a current limiting resistor R13, output terminal 57 and a spillover diode D6 in its forward low impedance direction to junction 58 between the two resistors of the voltage divider and this junction is also connected through a smoothing capacitor C5 to common conductor 52. Normally, the voltage divider maintains a voltage at junction 58 to block diode D6 so that the output voltage must reach a given value to spill over through diode D6 for limiting purposes. This blocking voltage is reduced by motor counter voltage as hereinafter described to reduce the percentage of torque obtainable at high speed.

A suitable proportion of the average terminal voltage of the left motor armature is connected to the current limit circuit by a voltage divider having resistors R14 and R15 connected in series and their junction connected to junction 58 of resistors R11 and R12. The resistor R14 side of this voltage divider receives the average terminal voltage from the positive side of the armature at the left end of inductor LSI through conductor 59 whereas the resistor R15 side thereof is connected through conductor 60 to the negative side of the armature at the junction between series field winding LSF and contacts R2 and F2. In this manner, the voltage divider R14 and R15 is connected across inductor LSI, series resistor LSR and left motor armature LMA. This average terminal voltage or counter voltage is used to control the current limiting (by drawing current through resistor R11 to lower the blocking voltage at junction 58 to allow diode D6 to spill over at a lower current reference voltage at output terminal 57) so that the controller can demand 250 percent of full load current at low speed but the maximum current is limited to 150 percent of full load current at full speed.

A current reference signal $I_{ref}$ is applied from output terminal 57 to the base of an NPN transistor T1 which is connected to a second NPN transistor T2. That is, the collectors of these two transistors are connected together and then through a resistor R16 to positive supply conductor 50 while the emitters thereof are connected through resistors R17 and R18, respectively, to common conductor 52. The emitter of transistor T1 is connected to the base of transistor T2. This circuit constitutes an amplifier which imparts high current gain to the current reference signal. The output is taken from the emitter of emitter follower transistor T2. A smoothing capacitor C6 is connected across emitter resistor R18 of transistor T2 for filtering and noise suppression.

At this point, a motor current feedback signal is added algebraically to the current reference signal. For this purpose, the output at the emitter of transistor T2 is connected through conductor 61 to the left side of left motor armature series resistor LSR whereas the right side of the latter is connected through conductor 62 and a small resistor R19 to the junction 64 of an input voltage divider of a level detector. In this current feedback signal circuit the left side of resistor R19 is connected by a smoothing capacitor C7 to conductor 52 and the right side thereof is connected by a smoothing capacitor C8 to common conductor 52. The aforesaid input voltage divider includes a resistor R20 connected between junction 64 and supply conductor 66 and a resistor R21 connected between junction 64 and common conductor 52.

The output voltage of the emitter follower at the emitter of transistor T2 may vary from 2 to 10 volts positive D.C., above the magnitude of the minimum voltage provided by diodes D5. This voltage may vary from 4.5 up to 10 volts under conditions of positive armature current for acceleration and may vary from 4.5 down to 2 volts under conditions of negative armature current for braking with a 2 volt pedestal on this voltage because less negative torque for braking is desired. Also, at junction 64, which is the input terminal of the voltage level detector of the left motor increase-decrease SCR firing circuit, the signal voltage may vary up or down from 4.5 volts D.C. positive.

Figure 5C:
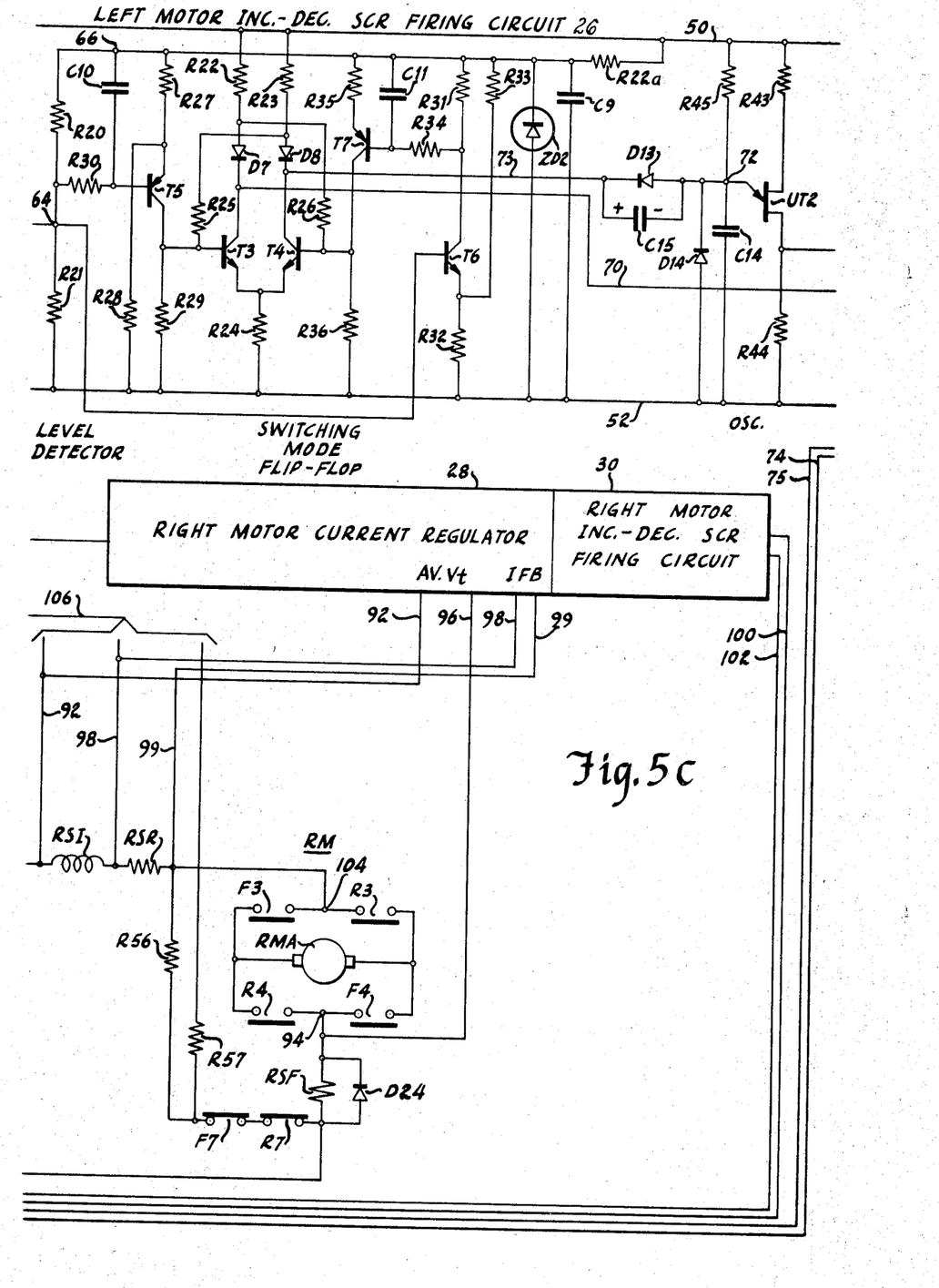
Figure 5D:
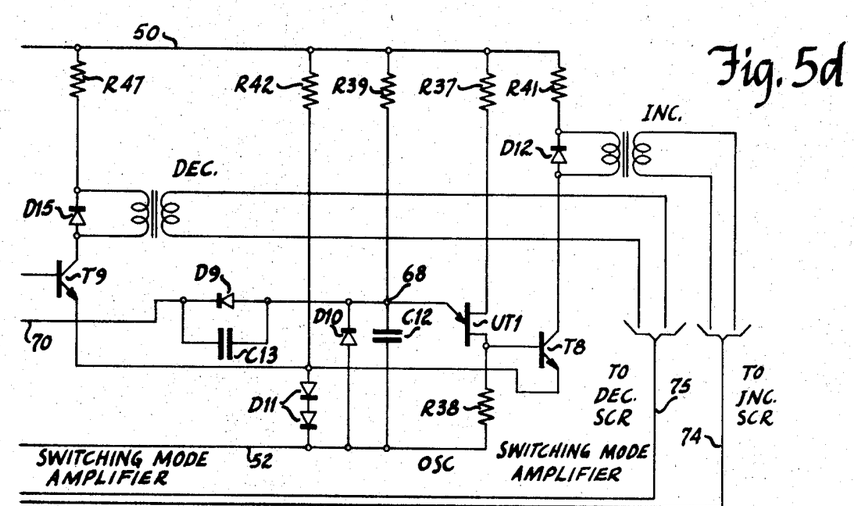

Referring now to the left motor increase-decrease SCR firing circuit in FIGS. 5c–d, it will be seen that the static switching mode or flip-flop portion of this circuit is supplied with 10 volts D.C. at conductor 66 from 20 volt positive D.C. supply line 50 through voltage dropping resistor R22a. This voltage is smoothed by a capacitor C9 connected from supply conductor 66 to common conductor 52 and is regulated by a Zener diode ZD2 connected across capacitor C9.

As shown in FIG. 5c, this static switch comprises a pair of NPN transistors T3 and T4 connected in flip-flop mode so that when one of these transistors is turned on, the circuit automatically turns the other transistor off so that only one of these two transistors can conduct current at any time. Supply voltage is applied from conductor 66 through a resistor R22 and a unidirectional diode D7 to the collector of transistor T3. Supply voltage is similarly applied from conductor 66 through a resistor R23 and a unidirectional diode D8 to the collector of transistor T4. The emitters of these two transistors are connected together and then through a resistor R24 to common conductor 52.

The collectors and bases of these transistors are cross-coupled by resistors R25 and R26 for alternate operation. Thus, the junction between resistor R23 and diode D8 in the collector circuit of transistor T4 is connected through resistor R25 to the base of transistor 73. Similarly, the junction between resistor R22 and diode D7 in the collector circuit of transistor T3 is connected through resistor R26 to the base of transistor T4. The outputs are taken from the respective collectors of the transistors. Diode D7 and D8 trap charge on capacitors in the output circuit as hereinafter described.

Each of the transistors in the aforesaid flip-flop circuit is provided with a driver circuit. For this purpose, transistor T3 is provided with a driver circuit comprising a single PNP transistor T5 while transistor T4 is provided with a driver circuit comprising two transistors, an NPN transistor T6 and a PNP transistor T7. This difference is due to the differences in the input circuits to the two driver circuits.

In the first mentioned driver circuit, supply voltage is applied from conductor 66 through a resistor R27 and a resistor R28 in series to common conductor 52 and from between these voltage divider resistors to the emitter of transistor T5 while the collector thereof is connected through a resistor R29 to common conductor 52. This collector is also connected directly to the base of transistor T3 of the flip-flop circuit. The aforementioned voltage divider voltage is applied from junction 64 of the level detector through a resistor R30 to the base of transistor T5. A noise suppression capacitor C10 is connected between supply conductor 66 and the base of transistor T5. This level detector voltage at junction 64 biases transistors T5 a small amount "on" for decrease SCR firing in the absence of an input current reference signal.

In the second mentioned driver circuit, supply voltage is applied from conductor 66 through a resistor R31 to the collector of transistor T6 while the emitter thereof is connected through a resistor R32 to common conductor 52. A resistor R33 is connected from conductor 66 to the emitter of transistor T6 and forms a voltage divider with resistor R32 to apply an off bias voltage to the emitter. Thus, increase is biased off and decrease is biased on before an input signal is applied to the level detector.

An output is taken from the collector of transistor T6 and applied through a resistor R34 to the base of transistor T7. Supply voltage is applied from conductor 66 through a resistor R35 to the emitter of transistor T7 while the collector thereof is connected to the base of flip-flop transistor T4 and also through a resistor R36 to common conductor 52. A noise suppression capacitor C11 is connected from conductor 66 to the base of transistor T7.

It will be apparent from the foregoing that the resistors of the level detector set transistors T5 and T6 for turn on at predetermined input voltage values at junction 64. A voltage of 5 volts or more at this junction causes transistor T6 to be rendered conducting. This causes transistors T7 and T4 also to be rendered conducting to shunt the decrease SCR firing circuit to render it ineffective thereby to allow the increase SCR firing circuit to operate as hereinafter described. On the other hand, a voltage of 4 volts or less at this junction causes transistor T5 to be rendered conducting. This causes transistor T3 also to be rendered conducting to shunt the increase SCR firing circuit to render it ineffective thereby to allow the decrease SCR firing circuit to operate as hereinafter described.

As shown at the upper portions of FIGS. 5c and 5d, each of the two outputs of the flip-flop circuit is connected for shunting out a relaxation oscillator whose output is connected to a switching mode output transistor amplifier, that is, an increase oscillator and output transistor and a decrease oscillator and output transistor. The increase oscillator comprises a unijunction transistor UT1 receiving supply voltage from conductor 50 through a resistor R37 to its base B2 while its base B1 is connected through a resistor R38 to common conductor 52. An RC circuit having a resistor R39 and a capacitor C12 in series connection in that order between conductor 50 and conductor 52 supplies voltage from junction 68 therebetween to the emitter of unijunction transistor UT1.

It will be apparent that the oscillator operates to apply pulses of current to the emitter of the unijunction transistor. Current flows through resistor R39 to charge capacitor C12. Each time the capacitor charges to the critical voltage, it discharges through the emitter-base B1 circuit of the unijunction transistor and resistor R38. When the capacitor voltage drops, the unijunction transistor restores to current blocking condition and the capacitor recharges. Thus, the RC and unijunction transistor circuit repeatedly produces pulses until the current to the capacitor is shunted by the flip-flop circuit of FIG. 5c.

This capacitor shunting circuit extends from junction 68 in FIG. 5d through a unidirectional diode D9 in its forward low impedance direction and conductor 70 to the collector of transistor T3 in the flip-flop circuit in FIG. 5c. It will be apparent that whenever transistor T3 is turned on, the charging current is shunted from capacitor C12 to stop the increase oscillator from running. A capacitor C13 is connected across diode D9 to provide a one-shot auxiliary charging path for capacitor C12 to start the oscillator running as soon as transistor T3 is turned off. A diode D10 is connected from common conductor 52 to junction 68 to form a discharge path for capacitor C13 effective when transistor T3 is turned on.

The output from the increase oscillator is applied from base B1 of the unijunction transistor to the base of an output NPN transistor T8 which is a switching mode amplifier. Supply voltage is applied from conductor 50 through a resistor R41 and the primary winding of an increase transformer INC to the collector of transistor T8 while the emitter thereof is connected through a pair of diodes D11 in series to common conductor 52. A resistor R42 is connected from positive supply conductor 50 through diodes D11 to common conductor 52 to form a voltage divider whereby the emitter of output transistor T8 is raised substantially a volt above the common conductor as reverse bias to insure turn off of the output transistor to counteract the effect of leakage current in resistor R38. A diode D12 is connected across the primary winding of output transformer INC to allow freewheeling current flow in response to the induced voltage therein.

The decrease oscillator is similar to the increase oscillator just described and comprises a unijunction transistor UT2 receiving supply voltage from conductor 50 through a resistor R43 to its base B2 while its base B1 is connected through a resistor R44 to common conductor 52. A RC circuit having a resistor R45 and a capacitor C14 in series connection in that order between conductor 50 and conductor 52 supplies voltage from its junction 72 therebetween to the emitter of unijunction transistor UT2.

For shunting capacitor C14 to stop the oscillator from operating, a circuit extends from junction 72 through a unidirectional diode D13 and a conductor 73 to the collector of transistor T4 in the flip-flop circuit. A capacitor C15 is connected across diode D13 for passing current for the first charging of capacitor C14 each time transistor T4 turns off. A diode D14 is connected from common conductor 52 to junction 72 to form a discharge path for capacitor C15. It will be apparent that when transistor T4 is rendered conducting, it shunts capacitor C14 to stop the decrease oscillator from running, and when transistor T4 is rendered non-conducting, the oscillator restarts running.

The output from the decrease oscillator is applied from base B1 of unijunction transistor UT2 to the base of an output switching mode amplifier transistor T9. Supply voltage is applied from conductor 50 through a resistor R47 and the primary winding of a decrease transformer DEC to the collector of transistor T9 while the emitter thereof is connected through off-bias diodes D11 to common conductor 52. A diode D15 is connected across the primary winding of output transformer DEC to allow freewheeling current flow in response to the induced voltage therein.

As shown in FIG. 5d, the secondary winding of output transformer INC is connected through conductors 74 to the gate and cathode of the increase SCR in the left motor chopper circuit in FIG. 5a and the secondary winding of output transformer DEC is connected through conductors 75 to the gate and cathode of the decrease SCR in the left motor chopper circuit in FIG. 5a. In this manner, whenever the increase oscillator runs, firing pulses will be applied to gate the increase SCR. Conversely, whenever the decrease oscillator runs, firing pulses will be applied to gate the decrease SCR.

The left motor chopper circuit in FIGS. 5a and 5b will now be described. This is a bilateral chopper; that is, it can pass current either in the forward or reverse direction therethrough. This chopper circuit is supplied with 250 volts D.C. across conductors 34 and 36. The positive motor torque circuit or increase circuit extends from positive supply conductor 34 through the increase SCR, a protective inductor 76, the upper half of a commutating inductor 78, left series inductor LSI, left series resistor LSR, forward contact F1, left motor armature LMA, forward contact F2 and left motor series field winding LSF to conductor 36. The negative motor torque circuit or decrease circuit extends from one side of armature LMA through forward contact F1, series resistor LSR, series inductor LSI, the lower half of commutating inductor 78, a protective inductor 80, the decrease SCR, a voltage trapping diode D16, conductor 36, series field winding LSF and forward contact F2 to the other side of the armature.

Additional elements in the chopper circuit include a capacitor C16 and a resistor R48 connected in series across the increase SCR to slow down the rate of change of voltage across the SCR and to absorb recovery transients. A capacitor C17 and a resistor R49 are connected in series across the decrease SCR for similar purposes. A by-pass current resistor R50 is connected across inductor 76 and a similar by-pass current resistor R51 is connected across inductor 80. A commutating capacitor C18 is connected between supply conductor 34 and the center point on commutating inductor 78 so as to be connected across the increase SCR, inductor 76 and the upper half of commutating inductor 78. In a similar manner, a commutating capacitor C19 is connected between the center point on commutating inductor 78 and the cathode of the decrease SCR so as to be connected across the lower half of the commutating inductor, inductor 80 and the decrease SCR.

Protective inductors 76 and 80 in the chopper circuit are ferrite core inductors for rate of change of current ($di/dt$) protection of the associated SCR's. These inductors are saturating reactors provided with individual cores of square hysteresis loop material and provide their protective functions when the respectively associated SCR's are fired. Without these reactors, the current would jump to the value flowing in the other SCR and its rate of change would be limited only by the leakage reactance of the commutating inductance coil. The ferrite inductor allows only a small current to flow, equal to the coercive ampere turns, until the core saturates, thus allowing the SCR time to turn fully on before the current increases to the load current level. The ferrite core is reset by a current that flows backwards through the SCR being turned off.

By-pass resistors R50 and R51 are provided in shunt of inductors 76 and 80, respectively, to allow in each case a larger reverse current to flow in the associated SCR to turn it off. When one SCR is turned on and the commutating inductor applies reverse voltage on the other SCR, the ferrite core inductor allows only about one ampere of reverse current to flow in the associated SCR. To increase this reverse current to about 4 to 5 amperes to insure turn-off of the SCR, a resistor such as R50 is placed across the ferrite core inductor to by-pass reverse current.

Additionally in the chopper circuit, there are provided means for recouping some of the commutating energy that was taken from the battery and feeding it back through the supply lines into the battery. For this purpose, the center point of the commutating capacitor is connected through the first part of the winding (primary) of a 1 to 7 turns ratio auto transformer AT and its tap and a feedback diode D17 in its forward low impedance direction to supply line 34. This auto transformer tap is connected through the second part of the winding (secondary) thereof and a feedback diode D18 in its forward low impedance direction to supply conductor 34. Negative conductor 36 is connected through a feedback diode D19 in its forward low impedance direction to the auto transformer tap at the left end of the secondary winding. Negative conductor 36 is also connected through a diode D20 in its forward low impedance direction to the right end of the secondary winding of the auto transformer.

The left motor armature and series field windings are connected to the chopper circuit. For this purpose, the center point of the commutating inductor is connected through left series inductor LSI and series resistor LSR to a positive voltage junction 82 at one side of the armature while negative voltage junction 84 at the other side of the armature is connected through series field winding LSF to negative supply conductor 36. Junctions 82 and 84 are connectable to the armature through either of two pairs of contacts for energizing the armature for forward or reverse rotation. For this purpose, positive junction 82 is connected through contacts F1 and R1 to opposite sides of the armature, respectively, and the opposite sides of the armature are connected through contacts R2 and F2, respectively, to negative junction 84. A unidirectional diode D21 is connected across left series field winding LSF to allow freewheeling current to flow to response to the voltage induced therein. This freewheeling diode avoids instability under overhauling load conditions.

Left motor shunt field winding LMF is connected in series with a resistor R52 across supply conductors 34 and 36. Right motor shunt field winding RMF is connected in parallel with left motor shunt field winding LMF. A freewheeling diode D22 is connected across the left motor shunt field winding and a free-wheeling diode D23 is connected across the right motor shunt field winding.

Certain signals are taken from the left motor chopper circuit in FIG. 5b and applied to the control circuit in FIGS. 5a–b. One of these signals is a wave shaping signal applied from the left end of series inductor LSI through conductor 86, resistor R53, left motor wave shaping feedback winding LMWSFB and conductor 88 to the right end of inductor LSI. As indicated by the plus sign at the magnetic amplifier, this wave shaping signal is opposite in polarity from the counter voltage feedback signal. Another signal is a voltage feedback signal applied from junction 82 on the positive side of the armature through resistors R54 and R55, conductor 90, left motor voltage feedback winding LMVFB of the magnetic amplifier and conductors 42 and 42a to negative supply conductor 36. As will be apparent, this circuit applies the motor voltage that appears across the armature and series field winding to the voltage feedback winding of the magnetic amplifier. Resistors R54 and R55 reduce this voltage to the proper amount before applying it to the left motor voltage feedback winding as a left wheel speed feedback signal. This voltage feedback signal is reduced to a magnitude so that it will provide substantially one-half of the total speed feedback ampere turns required in the magnetic amplifier, the other half of these ampere turns being provided by the right motor chopper circuit. Normally closed contacts F6 and R6 of the forward and reverse contactors are connected in series across voltage feedback winding LMVFB and resistor R55 to shunt the voltage feedback signal and render it ineffective when forward-reverse switch FR is turned off to prevent erratic signals from being applied therethrough into the control system.

Since right motor current regulator 28 is similar to left motor current regulator 24 hereinbefore described, it has been shown schematically in FIG. 5c. Also, right motor INC.-DEC. SCR firing circuit 30 is similar to left motor INC.-DEC. SCR firing circuit 26 hereinbefore described in detail, and has been shown schematically in FIG. 5c. Moreover, right motor chopper 14 is similar to left motor chopper 10 hereinbefore described in detail and has been shown schematically as a rectangle in FIG. 5b. The connections to these right motor control circuits 28, 30 and 14 will be described.

Included in these connections is the aforementioned supply voltage connection from right supply transformer RST in FIG. 5a through cable 48 to the right motor current regulator in FIG. 5c, and the connection from secondary winding S2 of the magnetic amplifier output transformer in FIG. 5a through cable 48 to the right motor current regulator. Another connection extends from the right motor current regulator through cable 48 to right motor local stabilizing feedback winding RMLSFB in the magnetic amplifier. An average terminal voltage connection extends from the left side (positive voltage side) of right motor series inductor RSI through conductor 92 and from terminal 94 at the negative voltage side of right motor armature RMA through conductor 96 to the right motor current regulator. A motor current feedback connection extends from the left side of right motor series resistor RSR through conductor 98 and from the right side of resistor RSR through conductor 99 to the right motor current regulator. Increase SCR and decrease SCR firing pulse connections extend from the right motor INC.-DEC. SCR firing circuit though lines 100 and 102, respectively, in FIG. 5c to the right motor chopper in FIG. 5b. All of these connections are made and function like the corresponding connections described in detail in connection with the left motor control circuits.

As shown in FIG. 5c, terminal 104 at the right end of series resistor RSR is connected by contacts F3 and R3 to the opposite sides, respectively, of right motor armature RMA and the opposite sides of the latter are connected through contacts R4 and F4, respectively, to common terminal 94. Terminal 94 is connected through right motor series field winding RSF to negative supply conductor 36. A freewheeling diode D24 is connected across this series field winding. A right motor voltage feedback signal reduced to one-half of the total required feedback is applied from terminal 104 through resistors R56 and R57 and cable 106, right motor voltage feedback winding RMVFB, and conductors 42 and 42a to negative supply conductor 36. Contacts F7 and R7 are connected in series across resistor R57 and the right motor voltage feedback winding to shunt them out when switch FS is turned off for reasons given in connection with the left motor circuit. A right motor wave shaping feedback signal is applied from across inductor RSI in FIG. 5c through conductors 92 and 98 and cable 106 to winding RMWSFB in the magnetic amplifier in FIG. 5a. As shown by the plus signs in FIG. 5a, the right motor wave shaping feedback winding is energized to opposite polarity with respect to the energization of the right motor voltage feedback winding. As a result, the wave shaping consists of cancelling out the A.C. portion of the voltage feedback.

Operation of the system of FIGS. 5a–d will now be described. It will be recalled that the START switch has been pressed to energize contactor M and switch FR has been turned to its FOR position to energize forward contactor F. As a result, contacts M1, M2 and M3 are closed to energize the shunt field windings LMF and RMF of the motors and contacts F1, F2, F3 and F4 are closed to connect the left and right motor armatures LMA and RMA to their respective chopper circuits 10 and 14. Interlock contact F5 is open in the reverse contactor circuit and contacts F6 and F7 are open to interrupt the shunts across voltage feedback windings LMVFB and RMVFB.

When the foot pedal is pressed to turn speed setter potentiometer POT clockwise, speed reference winding REF is energized to turn the magnetic amplifier on. As a result, an output voltage indicative of error voltage $V_e$ is applied from transformer XY to both the left motor current regulator and the right motor current regulator. This error voltage is applied through rectifier bridge RB2 and the LC filter and resistor R13 to output terminal 57 and becomes current reference $I_{ref}$. This current reference voltage is normally applied from terminal 57 to the base of transistor T1 but if it is above a predetermined value it will instead spill over through diode D6 for current limiting purposes.

The value at which the current reference voltage will spill over depends on the voltage appearing at terminal 58 connected to the cathode of diode D6. Thus, diode D6 will not pass current until the voltage on its anode side exceeds the blocking voltage on its cathode side. The voltage divider including resistors R11 and R12 and diodes D5 sets the blocking voltage at terminal 58 at 11 volts positive, for example, and with a 2 volt pedestal provided by diodes D5, the current reference voltage must exceed 9 volts to spill over through diode D6. This 2 volt pedestal may be changed in value by using more or less diodes D5 in series since it is the amount by which the braking torque is reduced below the positive torque.

If the blocking voltage at terminal 58 is reduced in proportion to motor speed, the current reference signal will spill over at a lower magnitude thereby to reduce the amount of motor current obtainable at high speed. In this manner, a large torque can be obtained for starting purposes and at low speed when it is needed and is limited to a smaller maximum value at top speed when it is not needed. For this purpose, the left motor terminal voltage is applied through conductors 59 and 60 and resistors R14 and R15 in series, the junction of these resistors being connected to terminal 58. As the terminal voltage across the motor increases with speed, the voltage at terminal 84 at the negative side of the armature becomes more negative and draws current from supply conductor 50 at the top of FIG. 5b through resistors R11 and R15 and conductor 60. This increasing current flow through resistor R11 lowers the voltage at terminal 58 with a linear taper. Assuming that going from zero counter voltage to 100 percent counter voltage (zero speed to full speed) reduces the voltage at terminal 58 by two volts, then the current reference signal will spill over at 7 volts at full motor speed whereas it can go up to 9 volts at low speed before spilling over. It may be assumed that this reduction in the blocking voltage of two volts will limit the current at full speed to 150 percent full load current whereas 250 percent of full load current can be obtained at low speed as shown by the sloping line in FIG. 4. It will be apparent that the values of these resistors may be selected for any desired current limiting in proportion to motor speed.

The current reference signal is applied from terminal 57 through the amplifier comprising transistors T1 and T2 as an emitter follower to lighten the loading on the magnetic amplifier. A current feedback signal is then algebraically added to it by resistor LSR for torque regulation purposes and the resultant signal voltage is filtered and applied to input terminal 64 of the voltage level detector.

When the voltage at the input of this level detector goes above 5 volts, the increase SCR in the chopper circuit is fired to increase the current to the motor. When the voltage at the input of this level detector falls below 4 volts, the decrease SCR in the chopper circuit is fired turning off INC, and causing current to change with a negative slope.

Normally, with no current reference signal being applied to terminal 64, transistor T5 will be biased "on" a small amount by the voltage divider R20–R21 keeping the voltage at terminal 64 less than 2 volts positive. Consequently, transistor T5 will conduct and will keep transistor T3 conducting. As a result, capacitor C12 of the relaxation oscillator in FIG. 5d will be shunted through diode D9, conductor 70, transistor T3 and resistor R24 to common conductor 52. This keeps capacitor C12 from charging so that no firing pulses will be sent to the increase SCR.

At the same time, transistors T4 will be in a non-conducting condition and capacitor C15 will be charged as shown. Current will flow from positive supply conductor 50 through resistor R45 to charge capacitor C14 and to discharge the same repeatedly into the emitter of unijunction transistor UT2. This will cause pulses to be sent through amplifier transistor T9, transformer DEC and conductors 75 to the decrease SCR to maintain decrease on.

Now, when the current reference signal is applied to the level detector to increase the voltage at terminal 64 above 5 volts, transistor T6 will be rendered conducting. This 5 volts will also reverse-bias the emitter-base circuit of transistor T5 to turn it off. Current flow through transistor T6 causes transistor T7 to be rendered conducting which in turn renders transistor T4 conducting. As a result, capacitor C14 is shunted by a circuit extending through diode D13, conductor 73, transistor T4 and resistor R24 to common conductor 52 to stop the output of decrease firing pulses.

Capacitor C13 is provided in order to get a pulse out of the increase oscillator as soon as possible. Resistor R22 has a relatively low value relative to resistor R39 so that current flow from conductor 50 through resistor R22, diode D7, conductor 70 and capacitor C13 quickly charges capacitor C12 to provide an increase firing pulse. Capacitor C13 has a larger capacitive value than capacitor C12 to provide large current flow. Capacitor C13 also charges in this circuit and diode D7 traps the charge on capacitor C13 so that thereafter capacitor C12 must charge through resistor R39 in the normal manner. Since capacitor C13 is charged, no more current can flow therethrough to capacitor C12.

When transistor T4 was turned on as aforesaid, capacitor C15 is discharged in a circuit extending through transistor T4, resistor R24, conductor 52 and diode D14. This prepares capacitor C15 for a one-shot passage of current to speed up the charging of capacitor C14 when decrease firing is again initiated.

The increase oscillator in FIG. 5d then operates. Capacitor C12 charges and discharges repeatedly into the emitter of unijunction transistor UT1. Each time this occurs, output transistor T8 is turned on to cause a firing pulse to be applied through transformer INC and conductors 74 to the increase SCR in FIG. 5a. This causes current flow from positive supply conductor 34 through the increase SCR, inductor 76, the upper half of inductor 78, inductor LSI, resistor LSR, contact F1, armature LMA, contact F2 and series field winding LSF to the negative supply conductor. With INC on current increases causing IR drop increase. This increase substracts from $I_{ref}$ signal and reduces the input signal to the level detector. When the input is reduced to less than 4 volts DEC is fired. The IR drop takes on a negative slope. When the sum of $I_{ref}$ and IR again becomes greater than 5 volts, INC is fired, etc. Typical switching rate of INC and DEC is 200 cycles per second; an average motor current is maintained. As a result, the left motor accelerates in the forward direction. Since a similar current reference signal voltage is applied from the magnetic amplifier in FIG. 5a to the right motor current regulator, the right motor is controlled in the same way as the left motor. The two motors accelerate to move the tractor ahead.

As shown in FIG. 6, the motor current increases with a positive slope when increase is fired and decreases with a negative slope when decrease is fired. The D.C. component of motor current remains at a relatively high positive value while the motor is accelerating as shown by the first portion of the curve. When the motor approaches running speed, the motor current decreases to the lower positive value shown as a steady state speed motoring current.

The final portion of the curve in FIG. 6 shows how the system is capable of regenerating and feeding energy back into the battery at any speed under overhauling load conditions such as deceleration or stopping or downhill operation. For example, if the speed setter is turned back for stopping, the error voltage goes to zero. With zero error voltage, the output of the current reference circuit will fall to pedestal level, that is, 2 volts. The input to the level detector will also fall to 2 volts minus any positive current feedback signal. Decrease will therefore, be gated continuously until armature current feedback reverses and drives the input to the level detector above 5 volts, which causes increase to be fired as shown by the positive slope REG in FIG. 6, followed by decrease, etc., alternately. Due to the inductor LSI, regeneration will take place and energy will be fed back into the battery. Although the motor counter voltage might be far lower than the 250 volt battery, each time increase is fired, the series inductor will raise the voltage to whatever value is necessary to pump energy back into the battery.

This pump back circuit may be seen at the lower portions of FIGS. 5a and 5b. At the start of the deceleration period of FIG. 6, the long negative slope occurs when decrease is fired. At first the current continues to flow in the forward directon through inductor LSI, resistor LSR, contact F1, armature LMA, contact F2, series field winding LSF and diodes D19 and D20 and auto transformer AT to inductor LSI. When the current reverses, it then flows from the armature through contact F1, resistor LSR, inductor LSI, the lower half of inductor 78, inductor 80, decrease SCR, diode D16, diode D21 and contact F2. When increase is fired to afford the pump back, shown by positive slope REG, current flows from inductor LSI through auto transformer AT, diodes D17 and D18, contact M1, battery 32, contact M2, diode D21, contact F2, armature LMA, contact F1 and resistor LSR. This is the pump back circuit wherein energy is fed back to the battery. In this circuit, diode D21 prevents reversal of the energization of the series field.

At this stage of the description, the SCR commutation may be considered. When the increase SCR was conducting current to the motor, commutating capacitor C19 charged through diode D16 in parallel with inductor LSI, resistor LSR and the motor armature and series field windings. This capacitor charges to about a 400 volt peak and this charge is trapped on the capacitor by diode D16. Since the increase SCR conducts more current than the decrease SCR and therefore requires more voltage to turn it off, diode D16 is used to trap charge on capacitor C19 to a higher level.

Now, when the decrease SCR is fired as aforesaid, capacitor C19 discharges through the lower half of commutating inductor 78, inductor 80 and the decrease SCR. The current in the lower half of inductor 78 induces a high voltage in the upper half thereof to reverse bias the increase SCR and turn it off. Capacitor C18 then charges preparatory to commutating the decrease SCR when the increase SCR is next fired.

The performance of this system when one wheel spins will now be described. It will be recalled that each speed feedback signal is reduced to one-half of the total steady state feedback value before being fed back to the magnetic amplifier winding LMVFB and RMVFB. This means that for any speed setting and no slippage, each motor counter voltage will supply one-half of the voltage feedback required by the magnetic amplifier for steady state conditions. If one wheel loses traction, the associated motor accelerates to a speed corresponding to 100 percent counter voltage. At any setting of the speed setter potentiometer up to its one-half point, the other wheel will lose torque since the motor driving the slipping wheel can supply the total voltage feedback required by the magnetic amplifier.

However, the wheel at standstill can be provided with torque by stepping the foot pedal beyond its one-half point. When this is done, the 100 percent counter voltage of the spinning motor cannot supply the required voltage feedback to the magnetic amplifier for steady state conditions. Consequently, the magnetic amplifier will provide an output voltage indicative of further acceleration and this will be applied to control the standstill motor to provide the torque required for moving the tractor.

The tractor can be run in the reverse direction by turning switch FR in FIG. 5a to reverse position REV. As will be apparent this will reverse the polarity of the voltage on the armatures and series field windings of both motors while the shunt field polarity remains the same to reverse the direction of rotation and drive the tractor backward.

While the system hereinbefore described is effectively adapted to fulfill the objects stated, it is to be understood that the invention is not intended to be limited to the particular preferred embodiment of electronic tractor drive system disclosed inasmuch as it is susceptible of various modifications without unduly departing from the scope of the appended claims.

I claim:
1. In a power control system for the electric motors which drive the respective left and right wheels of a vehicle, the combination comprising:
   a direct current electrical power source for supplying operating power to the system;
   a speed setter adapted to be controlled by the vehicle operator for providing a speed reference signal indicative of the desired speed of the motors;
   individual control means for the respective left and right motors operalbe variably to control the speeds thereof;
   common control means including signal comparator means controlled by said speed reference signal to provide a current reference signal which is applied to both of said individual control means to operate the same and control the speeds of the motors;
   speed feedback means for returning from each left and right motor a speed feedback signal and comparing the sum thereof in said signal comparator means with said speed reference signal to provide a resultant current reference signal for speed regulation;
   and said speed feeback means comprising means for reducing each of the speed feedback signals to one-half the value required by said signal comparator means for steady state operation at any given speed setting whereby in the event one wheel loses traction and spins, actuation of said speed setter beyond its halfway point will cause production of torque in the other wheel motor to keep the vehicle moving.

2. The invention defined in claim 1, wherein each said individual control means comprises:
   a chopper circuit comprising controlled rectifiers supplied from said D.C. source for supplying current to the associated motor on a controlled basis;
   a firing control circuit for the controlled rectifiers of said chopper circuit;
   a signal level detector for controlling said firing control circuit;
   and a current regulator circuit for supplying the signal to said signal level detector.

3. The invention defined in claim 2, wherein said current reference signal regulator circuit comprises:
   means for limiting the variation of the current reference signal value in a direction that is indicative of positive motor torque thereby to provide current limiting during motor acceleration.

4. The invention defined in claim 3, wherein said current regulator circuit also comprises:
   means for varying the action of said limiting means as a function of motor speed so that the amount of motor current obtainable is substantially greater at starting where it is needed than at high speed where a lesser value is adequate.

5. The invention defined in claim 4, wherein said means for varying the action of said limiting means comprises:
   means responsive to the motor terminal voltage for reducing the blocking voltage on said limiting means.

6. The invention defined in claim 2, wherein said current reference signal circuit comprises:
   means for limiting the variation of the current reference signal value in a direction that is indicative of negative motor torque thereby to afford smoother deceleration of the motor.

7. The invention defined in claim 2, wherein said current regulator circuit comprises:
   means for deriving a feedback signal proportional to motor current and subtracting it from said current reference signal for motor current regulation purposes.

8. The invention defined in claim 1, wherein said common control means including signal comparator means comprises:
   a magnetic amplifier for subtracting the sum of the speed feedback signals from the speed reference signal to provide said resultant current reference signal;
and an A.C. power supply circuit supplied from said D.C. source to provide alternating current for operating said magnetic amplifier.

9. In a power control system for the electric motors which drive the respective left and right wheels of a land vehicle, the improvement comprising:
- a portable D.C. source adapted to be carried on the vehicle that is to be driven;
- a speed setter supplied from said source and adapted to be controlled by the driver of the vehicle for providing a speed reference signal;
- common control means including signal comparator means controlled by said speed reference signal for providing a current reference signal;
- individual control means for the respective left and right motors supplied from said source and controlled by said common current reference signal for accelerating the motors;
- speed feedback means for returning from one left and one right motor a speed feedback signal and comparing the sum of these feedback signals in said signal comparator means with said speed reference signal to obtain a modified current reference signal for controlling the speeds of the motors;
- and said speed feedback means including means for reducing each said speed feedback signal to a predetermined proportion of the total speed feedback signal required by said common comparator means for steady state operation at any given speed setting whereby in the event one wheel loses traction and spins, actuation of said speed setter beyond a correspondingly predetermined proportional point of its full operating range will cause torque to be applied to the other wheel.

10. In a power control system for the electric motors which drive the left and right wheels of a land vehicle of the type wherein steering is accomplished by means independent of the drive wheels, the improvement comprising:
- a D.C. source of power adapted to be carried on the vehicle that is to be driven;
- a left motor chopper and a right motor chopper supplied from said source and including SCR's for delivering direct current to the left and right wheel motors on a controlled basis to control the speeds of the motors;
- individual firing circuits suppled from said source for the respective left and right choppers for gating the SCR's therein;
- individual current reference regulator circuits supplied from said source for the respective firing circuits for regulating the respective current reference signals applied to the latter;
- a common control circuit supplied from said source for supplying the same current reference signal to both of said current reference regulator circuits;
- an operator controlled speed setter means supplied from said source for applying a speed reference signal to said common control circuit to set the desired speed of the motors;
- and means individual to each motor for sending back a speed feedback signal to said common control circuit for comparison of the sum thereof with said speed reference signal to provide a resultant current reference signal and each said speed feedback signal having a value equal to substantially one-half the total feedback signal required for steady state operation at any given speed setting whereby in the event of slippage of one wheel the operator can produce torque in the other wheel motor by actuating said speed setter beyond its halfway point.

References Cited

UNITED STATES PATENTS

| | | | |
|---|---|---|---|
| 1,495,788 | 5/1924 | Franz | 318—99 |
| 3,263,142 | 7/1966 | Adoutte | 318—99 |
| 3,296,510 | 1/1967 | Stamm | 318—52 |
| 3,297,926 | 1/1967 | Campbell | 318—138 |
| 3,378,743 | 4/1968 | Weiser | 318—52 |

ORIS L. RADER, Primary Examiner

A. G. COLLINS, Assistant Examiner